July 20, 1937.  S. COOPER  2,087,796
TEA BAG AND THE LIKE
Original Filed Oct. 30, 1933
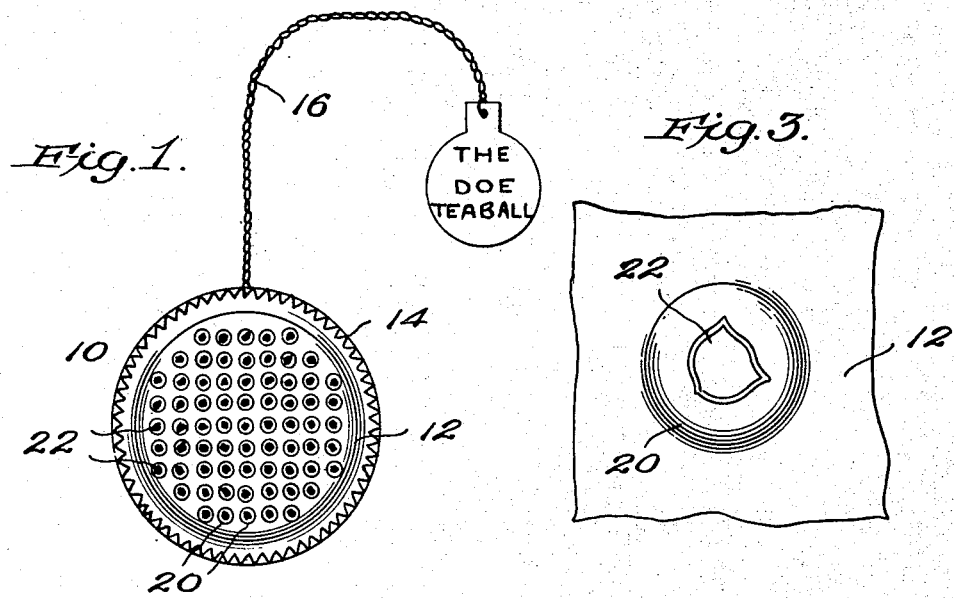
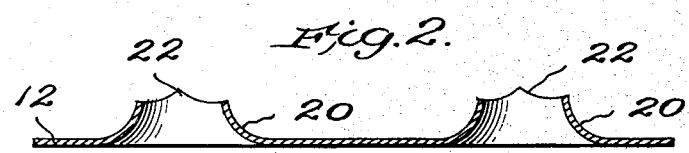
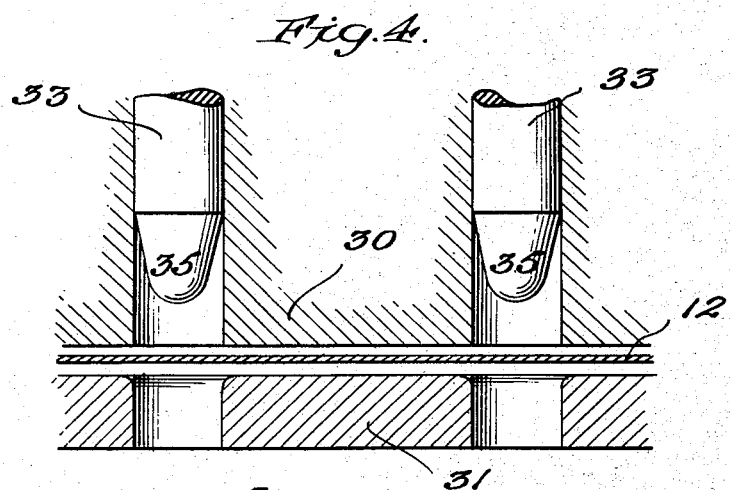
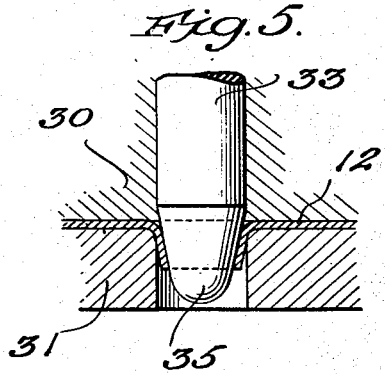
INVENTOR.
SIMON COOPER.
BY
ATTORNEY Patented July 20, 1937

2,087,796

UNITED STATES PATENT OFFICE 2,087,796

TEA BAG AND THE LIKE

Simon Cooper, Brooklyn, N. Y., assignor to Cooper Tea Packet Company, Brooklyn, N. Y., a corporation of New York Original application October 30, 1933, Serial No. 695,943. Divided and this application September 11, 1934, Serial No. 743,621

3 Claims. (Cl. 99—77.1)

This invention relates to tea bags and the like, the envelopes of which are formed from a novel form of perforated sheet material, and provides improvements therein.

Tea bags have heretofore been made of perforated "Cellophane." The word "Cellophane" is understood to be a trade-mark used in connection with a widely used sheet material, which is understood to be a sheet formed by evaporating liquid films of cellulose-esters dissolved in suitable solvents. It has been found that tea-bags made of perforated "Cellophane" frequently burst when dangled or jiggled in hot water in the act of infusing the water with the extract from the tea-leaves contained in the bag. "Cellophane" has the pecularity of being tough when there are no slits or incisions in it, but of tearing with exceptional ease when it has a slit or incision at which a tear may initiate. Examination of perforated "Cellophane" under a microscope has revealed tiny fissures running into the "Cellophane" from the edges of the perforations, and this discovery applied to the knowledge of the way in which tea-bags are used, explains the ease with which tea bags made of "Cellophane" burst when manipulated in hot-water in the brewing of tea. A mass of tea-leaves acquires considerable weight from absorption of water, and this weight acting on the "Cellophane", weakened by the fissures running into it from the edges of the perforations, causes the "Cellophane" to tear, and the tea-leaves thereby escape into the cup or vessel in which the tea is being brewed.

The present invention provides tea bags having envelopes of perforated "Cellophane" or the like, which tea bags formed of such material will withstand forces tending to tear or burst the same to a much greater extent than tea bags made of perforated "Cellophane" heretofore used in making such tea bags.

An embodiment of a tea bag made according to the present invention, and figures illustrating a mode of procedure in forming the perforated sheets of "Cellophane" and the like used in making the tea bags are illustrated in the accompanying drawing.

In said drawing Fig. 1 is a face view of a completed tea bag. The size of the perforations is however exaggerated.

Figs. 2 and 3 are respectively, a sectional view and a plan view of the perforated sheet made according to my invention, the dimensions being greatly exaggerated.

Figs. 4 and 5 are vertical sectional views illustrative of a mode of procedure for forming the perforated material.

Referring to said drawing, numeral 10 designates an envelope which may be formed of perforated sheets 12 of "Cellophane", and containing within the envelope dried tea leaves. The envelope containing the tea leaves is used in brewing the drink "tea" by steeping the tea leaves contained in the tea ball, in hot water.

The two sheets of perforated "Cellophane" 12 may be held together at their edges by a seam 14, of thread. The envelope may have a cord or string 16 attached thereto for dangling it in hot-water.

As hereinbefore set forth, perforated "Cellophane" heretofore used for tea bags does not give complete satisfaction owing to more or less frequent bursting of the perforated "Cellophane" envelope, particularly in the manipulation or dangling of the tea-ball in hot-water in the act of brewing the tea.

The principal contributing cause to the bursting of the perforated "Cellophane" material appears to be the fissures incident to, and running into the material from, the perforations which are made in the "Cellophane" material. The perforations being in the flat material, the strains incident to the use of the material, are borne by the material which is weakened by the fissures running inward from the perforations.

According to the present invention the perforations are formed, not in the flat material, but in bosses projecting from the flat material. By providing or arranging the perforations in bosses raised from the sheet, the weakness in the material adjacent the perforations, and incident to the perforating, are confined to the bosses, and are not created in the sheet itself. Referring to Figs. 2 and 3, bosses 20 are shown as projecting from the sheet of "Cellophane" 12, and the perforations 22 are formed in the bosses 12. The perforations 22 are in the apex portions of the bosses 20. The strains against the material 12 are therefore borne by those portions of the material into which fissures from the perforations have not entered. Consequently the perforated "Cellophane" is much better able to withstand strains, when made according to the present invention, than in the case where the material is weakened by fissures which run into the part of the material which bears the tensional strains incident to use. Fissures running into the embossed portion 20 from the perforation 22 in the apex do not weaken the material in the same way that fissures do which enter the flat portion of the sheet 12.

The perforation may be carried out as a part of the operation of embossing the "Cellophane". Referring to Figs. 4 and 5, a sheet of "Cellophane" 12 may be interposed between dies 30, 31. One of the dies, as 30 may be provided with a series of punches 33. These punches 33 are forced against the "Cellophane" 12 while held between the dies, and the punches 33 being provided with blunt ends 35, the first action of the punches is to emboss the "Cellophane", and, as the movement of the punches continues, the ends of the punches burst through the apex of the boss. The piercing movement of the punches is stopped when the "Cellophane" is punctured, thus resulting in a perforation or aperture somewhat less than the cross sectional area of the punch.

I consider as like "Cellophane" very thin material which is amorphous, or substantially so, such as thin parchmented paper.

The invention may receive other embodiments than that herein specifically illustrated and described.

What is claimed is:

1. A tea-bag package for individual use comprising sheet material, one layer of which is superposed on another enveloping a charge of dry tea leaves, means closing the free edges of the superposed layers of sheet material so that the charge of tea-leaves is completely enveloped, said sheet material being of a kind in which tears readily start from perforations therein, said material having bosses in the body thereof, and said bosses having perforations in the apex portions thereof, such fissures at the edges of perforations as are incidental to the perforation being confined to the material of said bosses.

2. A tea-bag package for individual use comprising sheet material, one layer of which is superposed on another enveloping a charge of dry tea leaves, a seam of thread closing the free edges of the superposed layers of sheet material so that the charge of tea-leaves is completely enveloped, said sheet material being of a kind in which tears readily start from perforations therein, said material having bosses in the body thereof, and said bosses having perforations in the apex portions thereof, such fissures at the edges of perforations as are incidental to the perforation being confined to the material of said bosses.

3. A tea-bag package for individual use comprising sheet material, one layer of which is superposed on another enveloping a charge of dry tea-leaves, means closing the free edges of the superposed layers of sheet-material so that the charge of tea-leaves is completely enveloped, said sheet material being "Cellophane" or like amorphous material in which tears readily start from perforations therein, said material having bosses in the body thereof, and said bosses having perforations in the apex portions thereof, such fissures at the edges of perforations as are incidental to the perforation being confined to the material of said bosses.

SIMON COOPER.